(12) United States Patent
Raviv et al.

(10) Patent No.: US 11,328,586 B2
(45) Date of Patent: May 10, 2022

(54) V2X MESSAGE PROCESSING FOR MACHINE LEARNING APPLICATIONS

(71) Applicant: Autotalks Ltd., Kfar Netter (IL)

(72) Inventors: Nir Raviv, Tel Aviv (IL); Leonid Prokupets, Rehovot (IL); Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 372 days.

(21) Appl. No.: 16/601,830

(22) Filed: Oct. 15, 2019

(65) Prior Publication Data

US 2021/0110709 A1    Apr. 15, 2021

(51) Int. Cl.
| | |
|---|---|
| *G08G 1/01* | (2006.01) |
| *H04W 4/44* | (2018.01) |
| *G07C 5/00* | (2006.01) |
| *G06N 20/00* | (2019.01) |
| *G07C 5/08* | (2006.01) |

(52) U.S. Cl.
CPC ........... *G08G 1/0112* (2013.01); *G06N 20/00* (2019.01); *G07C 5/008* (2013.01); *G07C 5/0841* (2013.01); *G08G 1/0125* (2013.01); *H04W 4/44* (2018.02)

(58) Field of Classification Search
CPC .................................................. G08G 1/0112
See application file for complete search history.

(56) References Cited

U.S. PATENT DOCUMENTS

| | | | |
|---|---|---|---|
| 10,812,992 B1* | 10/2020 | Tran ...................... | B64C 39/024 |
| 10,992,752 B2* | 4/2021 | Graefe ..................... | H04L 67/12 |
| 11,036,370 B2* | 6/2021 | Adenwala ............... | H04W 4/21 |
| 11,153,721 B2* | 10/2021 | Graefe .................... | H04W 4/40 |
| 2019/0339082 A1 | 11/2019 | Doig et al. | |
| 2020/0365033 A1* | 11/2020 | Cheng .............. | G08G 1/096791 |
| 2021/0110709 A1* | 4/2021 | Raviv ...................... | G06N 3/04 |
| 2021/0303137 A1* | 9/2021 | Adenwala ........... | G06F 3/04842 |

* cited by examiner

*Primary Examiner* — Michael A Berns
(74) *Attorney, Agent, or Firm* — Nathan & Associates; Menachem Nathan

(57) ABSTRACT

Methods and systems for processing vehicle to everything (V2X) messages for use by machine learning applications are disclosed. From each of a plurality of vehicles, one or more V2X messages are received, each V2X message including vehicle-related data associated with the vehicle and the received message. A sequence of frames is generated based on the vehicle-related data from at least a subset of vehicles in the plurality of vehicles. Slices of the sequence of frames are aggregated to generate a plurality of time-lapse images. One or more time-lapse images are processed using a machine learning algorithm to generate an output indicative of a traffic-related prediction.

20 Claims, 9 Drawing Sheets

V2X MESSAGE PROCESSING FOR MACHINE LEARNING APPLICATIONS

FIELD

Embodiments disclosed herein relate in general to processing vehicle-to-everything (V2X) messages and in particular to processing V2X messages for machine learning applications.

BACKGROUND

V2X promises to increase the level of vehicle safety by enabling reliable and early alerts of dangerous situations. V2X communication alerts a driver about an impending accident, such as when two vehicles approaching an intersection are on a collision course. Vehicles equipped for broadcasting V2X messages typically transmit real-time data about the vehicle's location, speed, heading, as well as numerous other data about the vehicle. Using machine learning, applications can be built that use V2X message data for a variety of purposes, such as traffic pattern learning, path prediction, and intersection classification, to name but a few.

However, in its received form, a collection of raw V2X messages does not lend itself well to analysis by machine learning algorithms. Therefore, systems and methods are needed to transform collections of raw V2X messages into other forms of data that can capture temporal and/or spatial information, such as images, and are better suited for machine learning-based applications.

SUMMARY

Embodiments disclosed herein relate to systems and methods for processing V2X messages so as to enable processing and analysis of the data contained therein by machine learning algorithms. In an example application, V2X messages are used to generate a plurality of time-lapse images showing vehicles' locations over time around a given intersection. The time-lapse images are then analyzed (e.g. classified) using machine learning to predict whether the intersection is a bridge, roundabout, or four-way cross.

In exemplary embodiments, there are provided methods comprising: by a processor, receiving, from each of a plurality of vehicles, one or more V2X messages, each V2X message including vehicle-related data associated with the vehicle and the received message, the vehicle-related data indicative at least of a vehicle identifier, message time, and vehicle current location, and generating, based on the vehicle-related data from at least a subset of vehicles in the plurality of vehicles, a sequence of frames indicative of the locations over time of each vehicle in the subset of vehicles.

In some embodiments, the method can include, by the processor, aggregating slices of the sequence of frames to generate a plurality of time-lapse images, each time-lapse image indicative of an approximate location at a given time of each vehicle in the subset of vehicles.

In some embodiments, generating a sequence of frames can include: for each message in a subset of received messages, generating a respective Boolean grid in which each cell in the grid corresponds to a geographical location, and associating the grid with respective vehicle-related data received in the message; for each grid, marking, based on the associated vehicle-related data, each cell that corresponds to a location occupied by the vehicle originating the message when the message is transmitted; and aggregating a plurality of grids in temporal order to generate the sequence of frames.

In exemplary embodiments, there are provided systems comprising a message collection module configured to receive, from each of a plurality of vehicles, one or more V2X messages, each V2X message including vehicle-related data associated with the vehicle and the message, the vehicle-related data indicative at least of a vehicle identifier, message time, and vehicle current location, and a data generation module configured to generate, based on the vehicle-related data from at least a subset of vehicles in the plurality of vehicles, a sequence of frames indicative of the locations over time of each vehicle in the subset of vehicles.

In some embodiments, the data generation module can be further configured to aggregate slices of the sequence of frames to generate a plurality of time-lapse images, each time-lapse image indicative of an approximate location at a given time of each vehicle in the subset of vehicles.

In some embodiments, the data generation module can be further configured to: for each message in a subset of received messages, generating a respective Boolean grid in which each cell in the grid corresponds to a geographical location, and associating the grid with respective vehicle-related data received in the message; for each grid, marking, based on the associated vehicle-related data, each cell that corresponds to a location occupied by the vehicle originating the message when the message is transmitted; and aggregating a plurality of grids in temporal order to generate the sequence of frames.

In some embodiments, the system can include a machine learning module.

In some embodiments, one or more time-lapse images can be processed using a machine learning algorithm to generate an output indicative of a traffic-related prediction. The machine learning algorithm can be a neural network machine learning algorithm. The one or more time-lapse images can each associated with a given intersection, and the traffic-related prediction can associate the given intersection with a given intersection type from one of several predetermined intersection types. The intersection type can be selected from the group consisting of a bridge, a roundabout and a four-way cross.

In some embodiments, the vehicle-related data can include data indicative of at least one of the vehicle's speed and heading.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals.

DETAILED DESCRIPTION

In various embodiments, there are disclosed systems and methods for transforming raw V2X messages into other forms of data, namely images. The images map out vehicle locations and other data over a defined period of time around a given geographical area, e.g. an intersection. The images may then be processed using a machine learning algorithm. The system may then output a prediction.

A system described herein can be comprised within any moving or stationary computer or component thereof. The term "computer" as used herein includes any suitable computer processing unit, such as, but not limited to, a vehicle's on-board computer, dedicated Road Side Unit (RSU), mobile device, field-programmable gate array (FPGA), system-on-a-chip (SOC), application specific integrated circuit (ASIC), etc. In some embodiments, the processing unit can be located in a "cloud" environment.

Under ordinary environmental conditions, V2X messages can be received up to a distance of around 500 meters from the vehicle originating the message ("originating vehicle"). Under ideal environmental conditions, such as on open highways, even greater distances are possible. Each V2X message will contain a variety of vehicle-related data associated with the originating vehicle. At a minimum, the vehicle-related data will include at least a vehicle identifier, current location coordinates (e.g. Global Positioning System (GPS) coordinates), speed and heading. In some cases the vehicle-related data can include much more. For example, the data can include the vehicle's size (e.g. length and/or width), whether the vehicle is an emergency response vehicle, whether the vehicle is braking, cruising or accelerating, and other information. A large number of data points from many originating vehicles can be analyzed by machine learning algorithms. These machine learning algorithms can find patterns in the data and can provide solutions to a variety of traffic-related applications.

One such application is described herein by way of example and in order to facilitate better understanding of the invention described herein. The exemplary embodiment relates to predicting, given the location of an intersection, whether an intersection is a bridge, roundabout, or four-way cross. However, it should be appreciated by those skilled in the art that this is by no means limiting, and that the concept described herein is in fact applicable to a variety of different applications. For the purposes of the exemplary embodiment, it is assumed that the system either has the coordinates of intersections in a given geographical area, e.g. via a map database, or alternatively can determine intersection coordinates via an intersection detection algorithm.

Figure 1:
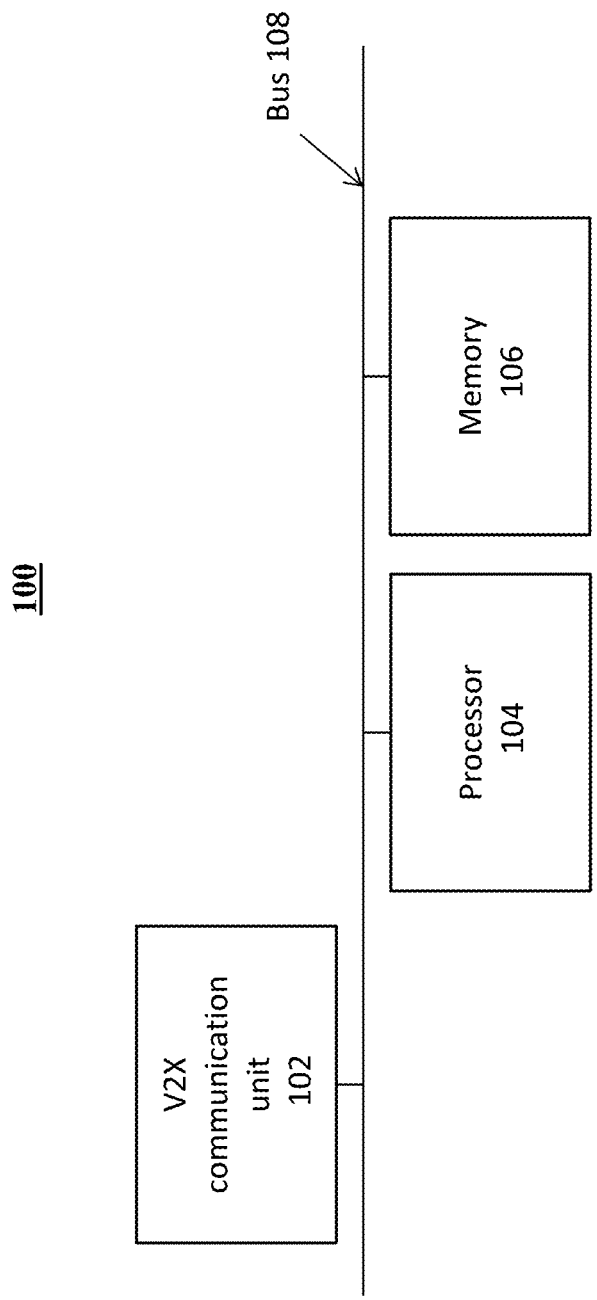
FIG. 1 illustrates a functional block diagram of a system for processing V2X messages.

Bearing this mind, reference is now made to FIG. 1, illustrating a functional block diagram of an embodiment of a system numbered 100. System 100 includes a V2X communication unit 102, a processor 104 and a non-volatile memory 106, all operatively coupled to one another via a data bus 108. V2X communication unit 102 may be configured to receive V2X messages broadcast by vehicles, and to pass those messages to processor 104 and/or memory 106 along bus 108.

Figure 2:
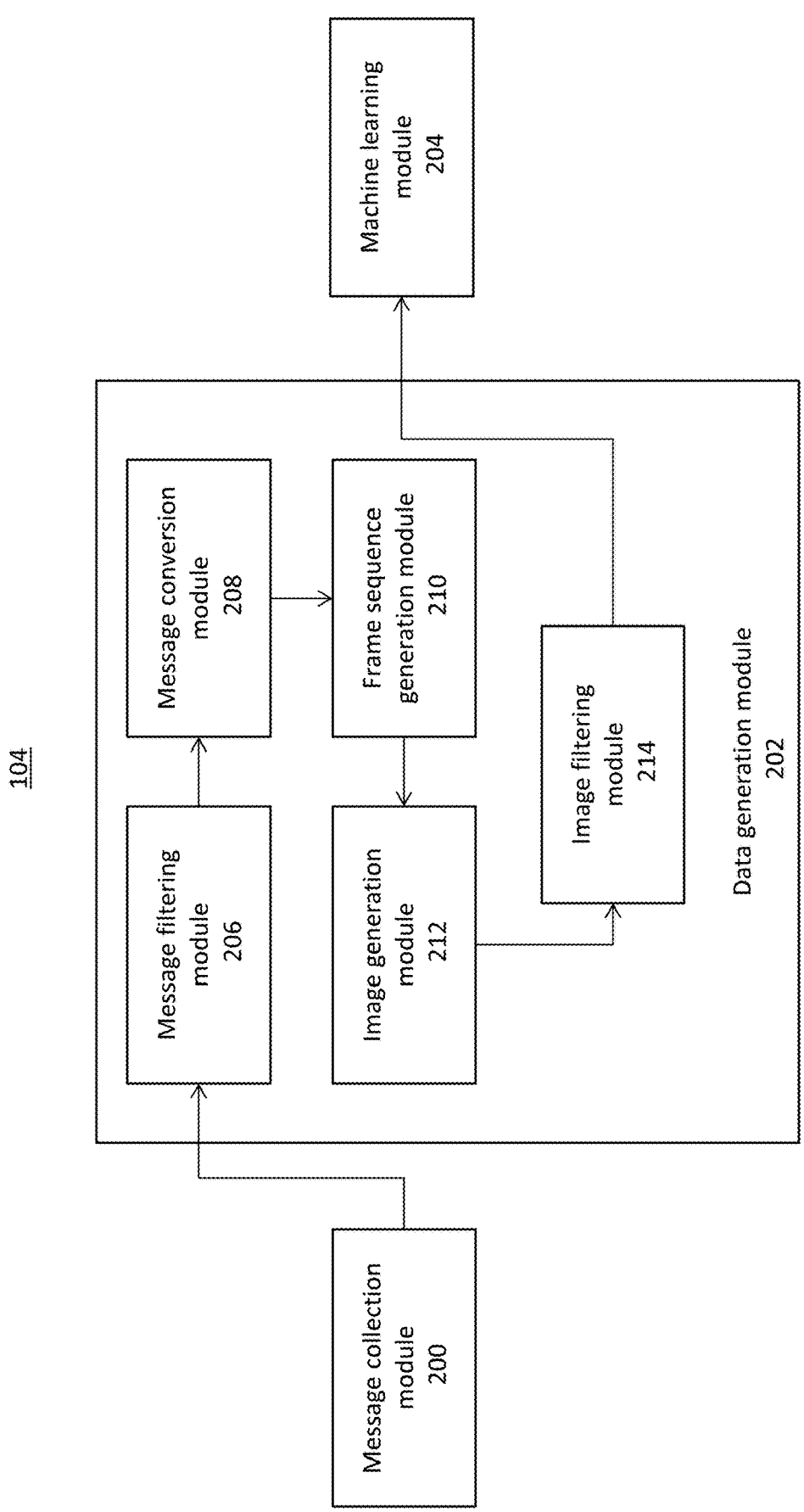
FIG. 2 illustrates an embodiment of a processor configured to execute a method for processing V2X messages.

FIG. 2 illustrates an embodiment of processor 104 configured to execute a method described herein. Processor 104 may include one or more modules configured to execute machine-readable code to perform the steps of the method. In an embodiment, processor 104 includes a message collection module 200 configured to receive and collect V2X messages from the V2X communication unit 102.

In an embodiment, processor 104 further includes a data generation module 202 configured to process the received V2X messages by extracting relevant vehicle-related data contained therein. Data generation module 202 then uses the extracted data to generate images, as further described below. Processor 104 further includes a machine learning module 204 configured to process the images generated by data generation module 202 using machine learning. Machine learning module 204 generates, as output, data indicative of a result, such as a prediction. For example, machine learning module 204 may process the images (or a subset thereof) using a learned model that may be generated during a prior training stage using labelled sets of images. The prediction can relate to a variety of traffic-related applications depending on the specific application for which system 100 is used. In an exemplary embodiment, given an intersection, the system processes the images to classify the intersection as one of a predetermined type of intersection. More specifically, the system predicts whether a given intersection is a bridge, roundabout, or four-way cross.

Data generation module 202 may include one or more modules configured to generate images from V2X messages. In an embodiment, data generation module 202 includes a message filtering module 206 configured to process the V2X messages collected by the message collection module, and filter out (i.e. discard) V2X messages which do not contain data deemed relevant for the specific application. For example, in the exemplary embodiment, messages originating from vehicles beyond a predetermined distance d from any intersection are considered not useful and filtered out.

In an embodiment, data generation module 202 further includes a message conversion module 208. Message conversion module 208 is configured to extract relevant vehicle-related data from each V2X message, and construct a Boolean grid associated with the message. It should be appreciated that which data is considered "relevant" is application specific. In the exemplary embodiment, the relevant data includes the vehicle identifier, time, location, speed and heading.

Using the location data, the distance between the vehicle and the center of an intersection I is computed. For simplicity assume that I is the intersection closest to the vehicle, although in reality it can be any intersection within the predetermined distance d. A Boolean n×n grid corresponding to the message is constructed, in which each cell corresponds to a geographic location of a fixed size, for example 1 $m^2$ (one square meter), around intersection I up to a predetermined radius r. The center of the grid corresponds to the center of the intersection. Each cell in which the corresponding geographic location is occupied by the vehicle that originated the message is marked as True (or "1"). All other cells are marked False (or "0"). Each grid is associated with the vehicle-related data contained within the corresponding message, namely vehicle identifier, time, speed and heading. In some embodiments, vehicle length and width may also be extracted from the V2X message and associated with the grid. In an exemplary embodiment, message conversion module 208 generates, as output, one set of Boolean grids per intersection to be classified.

Figure 3:
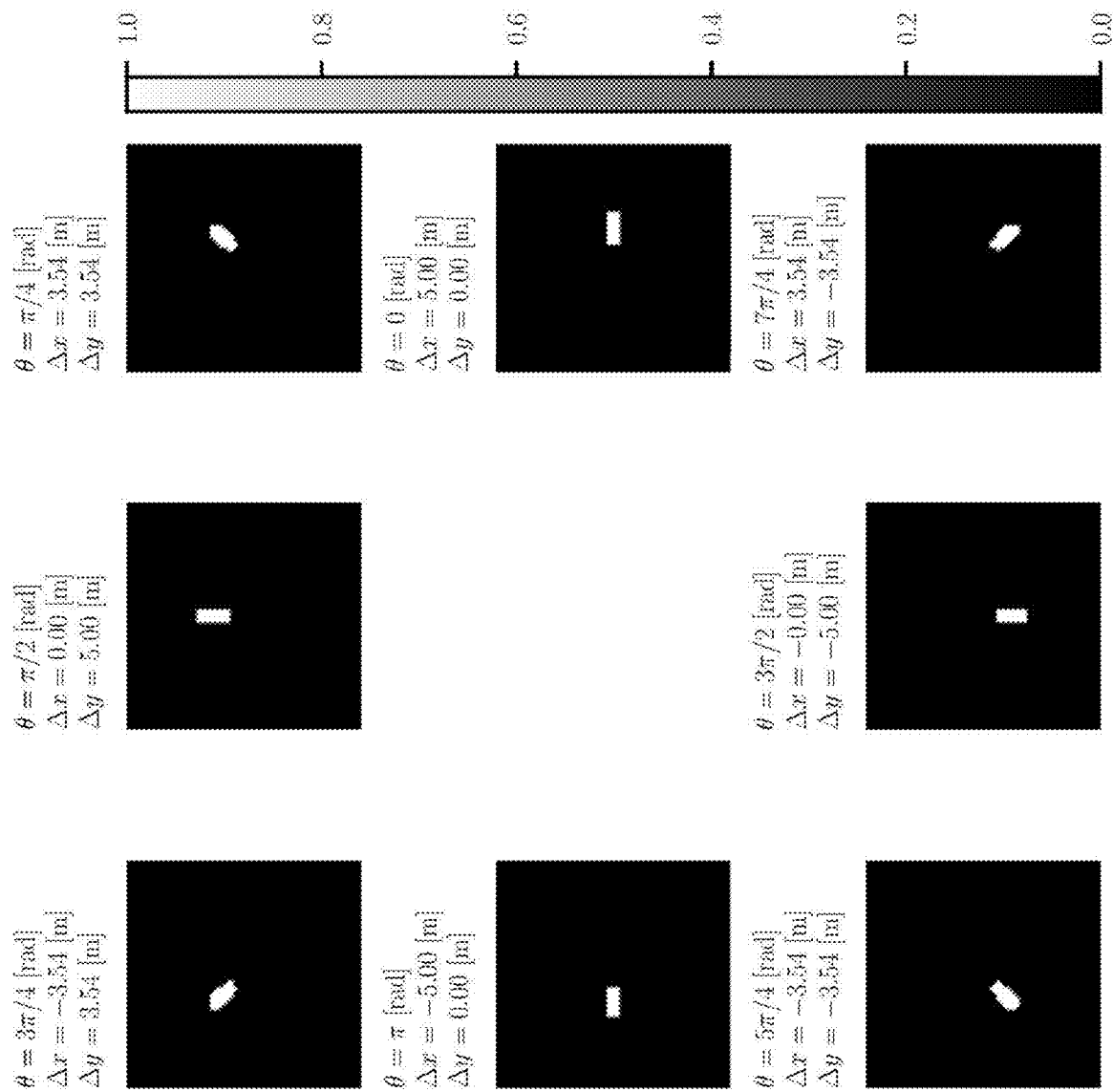
FIG. 3 illustrates an example of a set of Boolean grids.

FIG. 3 illustrates an example of a set of Boolean grids that may be generated for a given intersection I based on messages received from vehicles during a given time period. In FIG. 3, θ represents the vehicle heading, and Δx and Δy are the vehicle coordinates relative to the intersection center. Note that a singular vehicle may broadcast a plurality of messages within the given time period, and therefore a plurality of grids may be associated with the same vehicle identifier. Each grid provides a snapshot-in-time view of a given vehicle around a given intersection along with associated vehicle-related data (speed, heading, etc.). Optionally, as shown in FIG. 3, different color pixels can be used to represent the relative speed (e.g. on a scale of 0-1) of the vehicle depicted in the grid.

In an embodiment, data generation module 202 further includes a frame sequence generation module 210. Frame sequence generation module 210 is configured to generate a temporal sequence of frames from an input set of Boolean grids corresponding to a given intersection I. The frame sequence generation module combines the data contained within all the Boolean grids at each timestep to generate the temporal sequence of frames. Within each frame, a plurality of vehicles' locations, headings and speeds are recorded, and may in fact be shown using predefined pixel color mappings, thereby providing a visual representation of each vehicle's spatial-temporal movement around a fixed reference point such as an intersection center.

Figure 4:
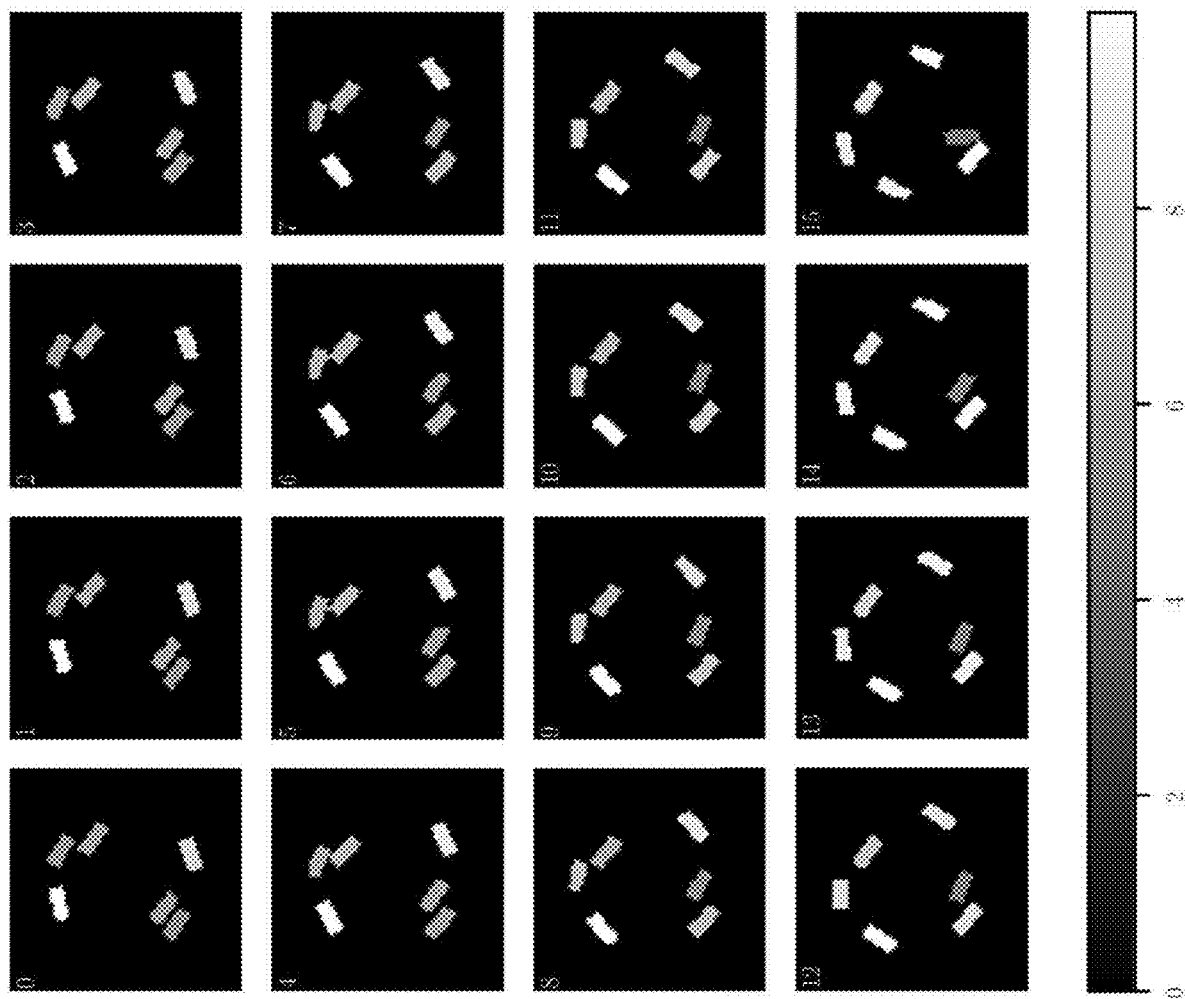
FIG. 4 illustrates a sequence of frames that may be generated from Boolean grids.

FIG. 4 illustrates a sequence of 16 frames (1-16) that were generated from a set of Boolean grids. Sequential frames are indicated by the frame number shown in the top left corner of each frame. In the example shown in FIG. 4, the frames were constructed from Boolean grids centered around a given intersection, in this case a roundabout intersection. As is apparent from in FIG. 4, the frames associate location data with temporal data, and the traffic "flow" can now be visualized. Thus, it will be appreciated that the temporal sequence of frames facilitates a much greater understanding of traffic patterns than would otherwise be available from the raw V2X messages. It will further be appreciated that the temporal sequence of frames generated from the messages can be processed and analyzed using a variety of known image processing algorithms to achieve a desired result or prediction. For example, by processing the frames using machine learning to learn and interpret patterns, one can develop solutions for a variety of different applications, including for example, intersection classification, path prediction, learning of roads, etc. As such, the system described herein provides a robust basis for analyzing data contained within V2X messages.

Depending on the specific application, in some embodiments it may be efficient to process the temporal sequence of frames using a machine learning algorithm, while in other embodiments it may be desirable to first process the temporal sequence images to generate a plurality of images, such as time-lapse images. The plurality of time-lapse images is then analyzed (e.g. classified) using machine learning. In such a case, data generation module 202 can optionally include an image generation module 212. Image generation module 212 may be configured to aggregate "slices" or chunks of the sequence of frames into images. For example, the frames can be traversed using a fixed-width sliding window corresponding to a predetermined time period (e.g. 10 sec), and at each traversal of the sliding window the frames within the window are aggregated into a single image. An averaging procedure may be used for aggregating frames. The output of image generation module 212 is a set of images, such as time-lapse images, in which each image is indicative of a plurality of vehicles' locations over a small period of time (e.g. 10 seconds). The set of images is indicative of the vehicles' movement over a much larger period of time.

In an embodiment, data generation module 202 can optionally include an image filtering module 214. Image filtering module 214 may be configured to filter out and discard images generated by the image generation module 212 that do not meet predetermined criteria. For example, images can be discarded that were generated from frames having fewer than n unique vehicles, where n is a predetermined number. Alternatively or additionally, some images can be discarded, e.g. if two or more images provide substantially the same data. In the exemplary embodiment, each set of images corresponds to a respective intersection I. A plurality of sets of images corresponding to a respective plurality of intersections can be produced from V2X message data received from vehicles in the vicinity of the respective intersections.

Figure 5:
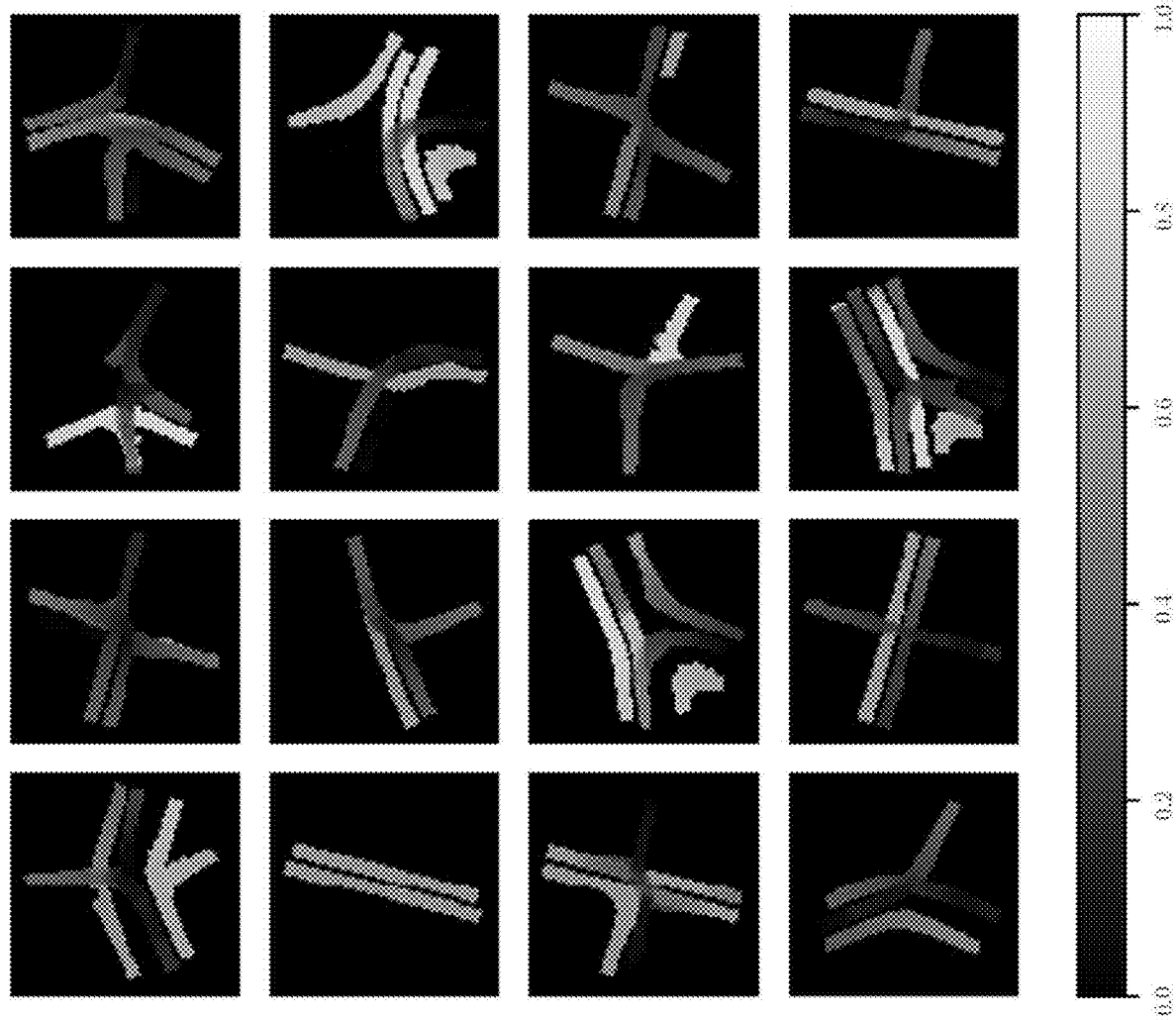
FIG. 5 illustrates a possible set of images that may be generated from a sequence of frames.

FIG. 5 illustrates by way of example a set of time-lapse images that may be generated from a temporal sequence of frames. In this case, the images related to a four-way cross intersection. As in FIG. 3, different color pixels may optionally be used to represent the relative speed of the vehicle.

As described above, depending on the specific application the output of data generation module 202 can be a temporal sequence of frames, or a plurality of time-lapse. In either case, the output is then fed to machine learning module 204. Machine learning module 204 is configured to generate, from an input set of data (the frames or images, collectively "images"), data indicative of a prediction. In an embodiment, machine learning module 204 classifies the images using any suitable machine learning algorithm known in the art as may appropriate for the specific application. In the exemplary embodiment, the machine learning algorithm is preferably an artificial neural network (ANN) or a variant thereof such as a residual network (ResNet), deep residual network (DRN), etc. Prior to implementation, the machine learning module may be trained using a labelled dataset of images in order to generate a classification model for classifying new sets of images based on the model. The model may then be applied to new images input to the module during execution of the system. In the exemplary embodiment, the machine learning module classifies an intersection, based on a given set of input images associated with the intersection, as one of predetermined type thereby predicting the type of intersection. In the exemplary embodiment, the system predicts whether the intersection is a bridge, roundabout, or four-way cross.

Figure 6:
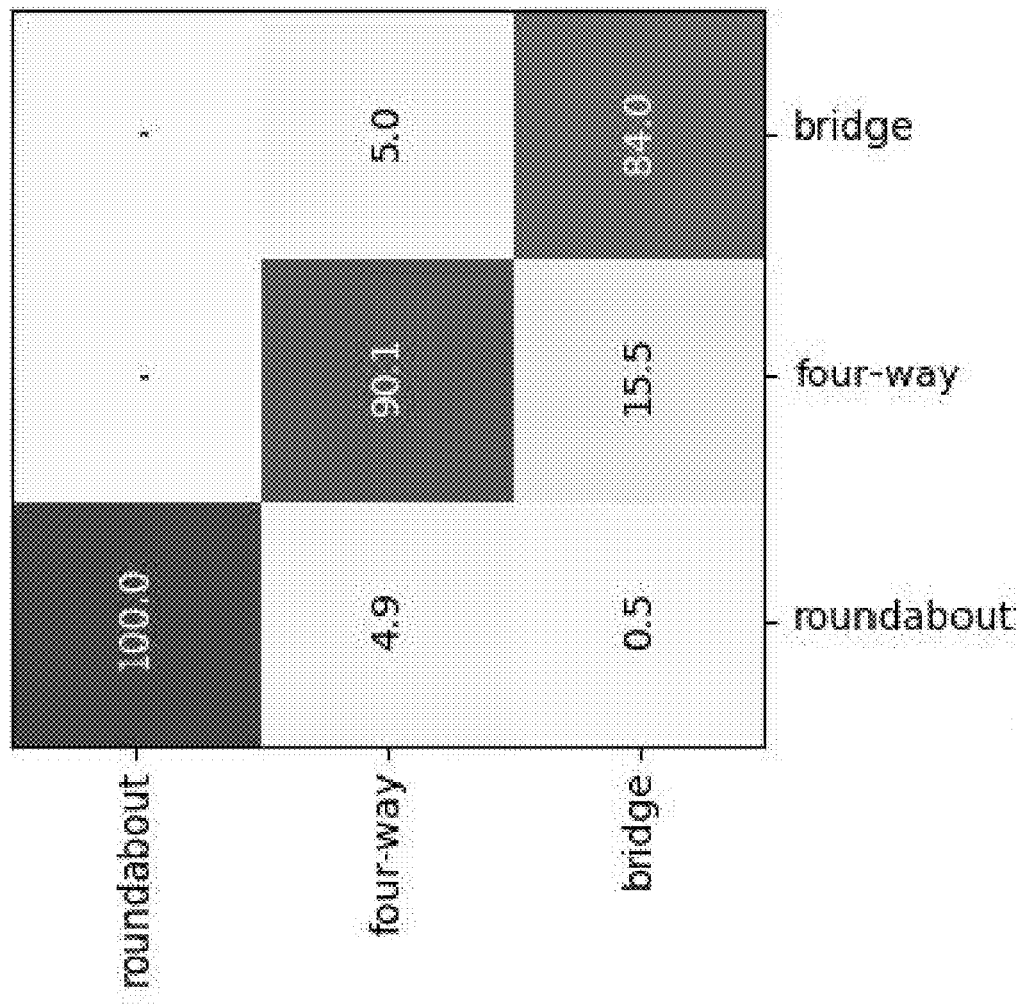
FIG. 6 illustrates a classification confusion matrix showing the classification results of a test dataset of images.
Figure 7:
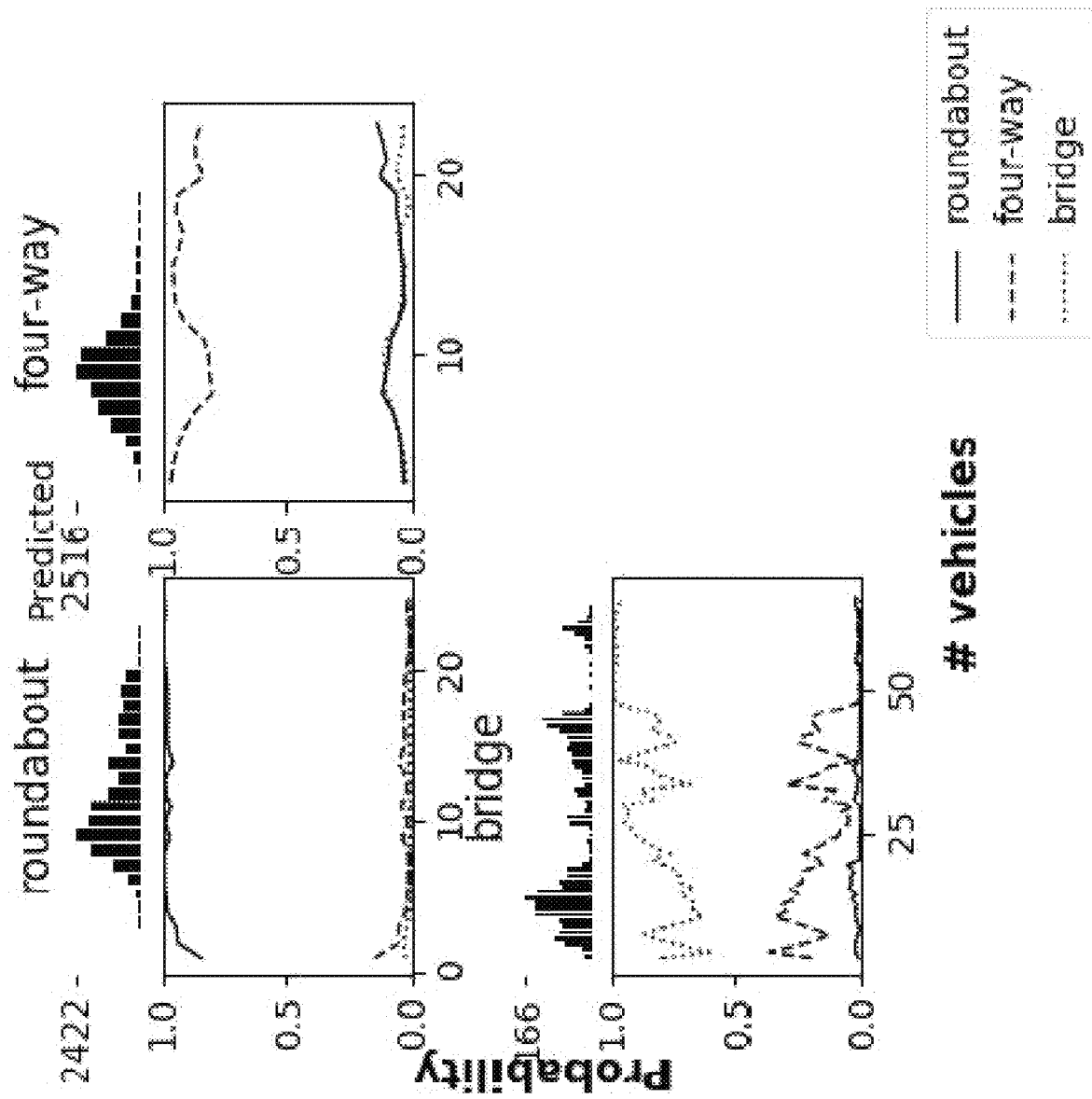
FIG. 7 shows a set of graphs showing the prediction accuracy for each type of intersection in the test dataset.

FIG. 6 illustrates a classification confusion matrix showing the classification results of a test dataset of about 33,000 sample images provided to the system described herein. As shown, the system was able to accurately predict roundabout intersections 100% of the time, bridge intersections 84% of the time, and four-way cross intersections 90% of the time FIG. 7 shows a set of graphs produced for the test dataset of FIG. 6 described above, in which each graph represents the average probability of accurate prediction for each type of intersection based on the number of vehicles and sample sizes (i.e. number of images). The sample sizes used for each prediction are represented visually via the histogram along the top of each graph. The horizontal axis represents the total number of distinct vehicles found in the image samples. The vertical axis represents the average probability of predicting a given intersection type for each sample size and number of vehicles. As shown in FIG. 7, the probability of predicting the correct intersection type increases as more vehicles are considered.

Figure 8:
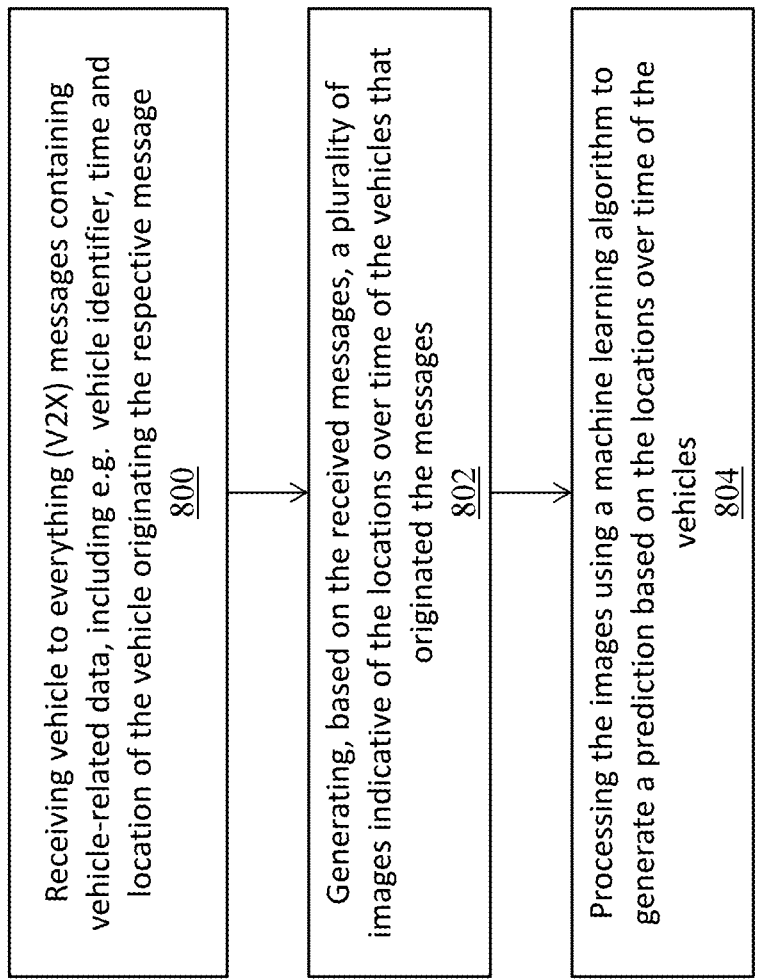
FIG. 8 illustrates a generalized flow chart of a method of processing V2X messages.

FIG. 8 illustrates a generalized flow chart of a method of processing V2X messages according to embodiments described herein. The method is executed by a processor such as processor 104. The method begins, at step 800, with receiving a plurality of V2X messages from a plurality of vehicles, each message containing vehicle-related data, e.g. vehicle identifier, time and location of the vehicle originating the respective message. Next, at step 802, a plurality of images is generated based on the received messages, the images indicative of the locations over time of originating vehicles. At step 804, the plurality of images is processed using a machine learning algorithm to generate a prediction based on the locations over time of the vehicles, i.e. classify the images based on a trained model.

Figure 9:
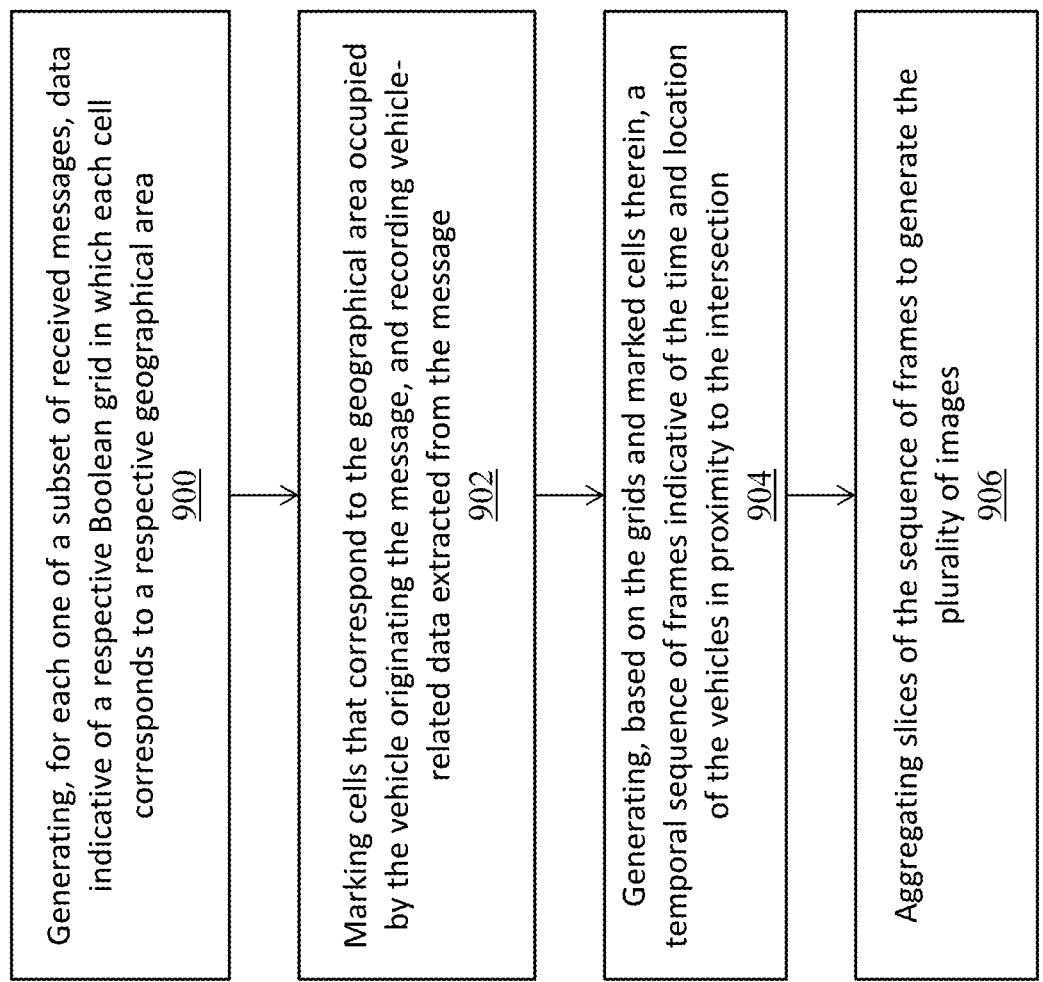
FIG. 9 illustrates a generalized flow chart of generating a plurality of images.

FIG. 9 illustrates a flow chart of an exemplary way of generating the plurality of images (step 802 in FIG. 8). At step 900, for each one of a subset of received messages (e.g. messages not discarded by message filtering module 206), data indicative of a respective Boolean grid is generated in which each cell corresponds to a respective geographical area in the vicinity of originating vehicles. At step 902, for each grid, cells that correspond to a location occupied by the vehicle originating the message at the time of the message are marked (e.g. based on the time and location data contained within the message used to generate the grid), and vehicle-related data is recorded. At step 904, based on the grids and the marked cells therein, a temporal sequence of frames is generated corresponding to the Boolean grids. At step 906, slices of the sequence of frames are aggregated into images, thereby generating the plurality of images.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the present application.

What is claimed is:

1. A method for processing vehicle to everything (V2X) messages for use by machine learning applications, comprising, by a processor:
   receiving, from each of a plurality of vehicles, one or more V2X messages, each V2X message including vehicle-related data associated with the vehicle and the received message, the vehicle-related data indicative at least of a vehicle identifier, message time, and vehicle current location; and
   generating, based on the vehicle-related data from at least a subset of vehicles in the plurality of vehicles, a sequence of frames indicative of the locations over time of each vehicle in the subset of vehicles.

2. The method of claim 1, further comprising, by the processor:
   aggregating slices of the sequence of frames to generate a plurality of time-lapse images, each time-lapse image indicative of an approximate location at a given time of each vehicle in the subset of vehicles.

3. The method of claim 2, wherein the generating a sequence of frames comprises:
   for each message in a subset of received messages, generating a respective Boolean grid in which each cell in the grid corresponds to a geographical location, and associating the grid with respective vehicle-related data received in the message;
   for each grid, marking, based on the associated vehicle-related data, each cell that corresponds to a location occupied by the vehicle originating the message when the message is transmitted; and
   aggregating a plurality of grids in temporal order to generate the sequence of frames.

4. The method of claim 1, further comprising, by the processor:
   processing one or more time-lapse images using a machine learning algorithm to generate an output indicative of a traffic-related prediction.

5. The method of claim 4, wherein the machine learning algorithm is a neural network machine learning algorithm.

6. The method of claim 4, wherein the one or more time-lapse images are each associated with a given intersection, and wherein the traffic-related prediction associates the given intersection with a given intersection type from one of several predetermined intersection types.

7. The method of claim 6, wherein the given intersection type is selected from the group consisting of a bridge, a roundabout and a four-way cross.

8. The method of claim 4, wherein the generating a sequence of frames comprises:
   for each message in a subset of received messages, generating a respective Boolean grid in which each cell in the grid corresponds to a geographical location, and associating the grid with respective vehicle-related data received in the message;
     for each grid, marking, based on the associated vehicle-related data, each cell that corresponds to a location occupied by the vehicle originating the message when the message is transmitted; and
   aggregating a plurality of grids in temporal order to generate the sequence of frames.

9. The method of claim 1, wherein the generating a sequence of frames comprises:
   for each message in a subset of received messages, generating a respective Boolean grid in which each cell in the grid corresponds to a geographical location, and associating the grid with respective vehicle-related data received in the message;

for each grid, marking, based on the associated vehicle-related data, each cell that corresponds to a location occupied by the vehicle originating the message when the message is transmitted; and aggregating a plurality of grids in temporal order to generate the sequence of frames.

10. The method of claim 1, wherein the vehicle-related data further comprises data indicative of at least one of the vehicle's speed and heading.

11. A system for processing V2X messages for use by machine learning applications, comprising:

a message collection module configured to receive, from each of a plurality of vehicles, one or more V2X messages, each V2X message including vehicle-related data associated with the vehicle and the message, the vehicle-related data indicative at least of a vehicle identifier, message time, and vehicle current location; and a data generation module configured to generate, based on the vehicle-related data from at least a subset of vehicles in the plurality of vehicles, a sequence of frames indicative of the locations over time of each vehicle in the subset of vehicles.

12. The system of claim 11, wherein the data generation module is further configured to aggregate slices of the sequence of frames to generate a plurality of time-lapse images, each time-lapse image indicative of an approximate location at a given time of each vehicle in the subset of vehicles.

13. The system of claim 12, further comprising a machine learning module configured to classify the plurality of time-lapse images using a machine learning algorithm and generate an output indicative of a traffic-related prediction.

14. The system of claim 13, wherein the machine learning algorithm is a neural network machine learning algorithm.

15. The system of claim 13, wherein the one or more time-lapse images are each associated with a given intersection, and wherein the traffic-related prediction associates the given intersection with a given intersection type from one of several predetermined intersection types.

16. The system of claim 15, wherein the given intersection type is selected from the group consisting of a bridge, a roundabout and a four-way cross.

17. The system of claim 13, wherein the data generation module is further configured to:

for each message in a subset of the received messages, generate a respective Boolean grid in which each cell in the grid corresponds to a geographical location and associating the grid with the respective message's vehicle-related data;

for each grid, mark, based on the associated vehicle-related data, each cell that corresponds to a location occupied by the vehicle originating the message at the time of the message; and aggregate a plurality of grids in temporal order to generate the sequence of frames.

18. The system of claim 12, wherein the data generation module is further configured to:

for each message in a subset of the received messages, generate a respective Boolean grid in which each cell in the grid corresponds to a geographical location and associating the grid with the respective message's vehicle-related data;

for each grid, mark, based on the associated vehicle-related data, each cell that corresponds to a location occupied by the vehicle originating the message at the time of the message; and aggregate a plurality of grids in temporal order to generate the sequence of frames.

19. The system of claim 11, wherein the data generation module is further configured to:

for each message in a subset of the received messages, generate a respective Boolean grid in which each cell in the grid corresponds to a geographical location and associating the grid with the respective message's vehicle-related data;

for each grid, mark, based on the associated vehicle-related data, each cell that corresponds to a location occupied by the vehicle originating the message at the time of the message; and aggregate a plurality of grids in temporal order to generate the sequence of frames.

20. The system of claim 11, wherein the vehicle-related data further comprises data indicative of at least one of the vehicle's speed and heading.

* * * * *